United States Patent
Takahashi (10) Patent No.: US 8,090,253 B2
(45) Date of Patent: Jan. 3, 2012

(54) PHOTOGRAPHING CONTROL METHOD AND APPARATUS USING STROBE

(75) Inventor: Shinri Takahashi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/545,143

(22) Filed: Aug. 21, 2009

(65) Prior Publication Data

US 2010/0046936 A1 Feb. 25, 2010

(30) Foreign Application Priority Data

Aug. 22, 2008 (KR) .................. 10-2008-0082455

(51) Int. Cl.
*G03B 15/03* (2006.01)
(52) U.S. Cl. ...................... 396/157; 348/371
(58) Field of Classification Search .................. 396/157, 396/166, 168, 179, 167; 348/371
See application file for complete search history.

(56) References Cited

U.S. PATENT DOCUMENTS

| | | | |
|---|---|---|---|
| 2007/0052821 A1* | 3/2007 | Fukui | 348/234 |
| 2007/0195191 A1* | 8/2007 | Ide et al. | 348/345 |
| 2008/0074536 A1* | 3/2008 | Tamura | 348/371 |
| 2008/0079819 A1* | 4/2008 | Uchida | 348/229.1 |
| 2008/0181597 A1* | 7/2008 | Tamura | 396/164 |
| 2008/0252749 A1* | 10/2008 | Fujiwara | 348/224.1 |
| 2010/0091135 A1* | 4/2010 | Iwamoto | 348/229.1 |

FOREIGN PATENT DOCUMENTS

JP 2003-107567 A 4/2003

* cited by examiner

*Primary Examiner* — Rodney Fuller
*Assistant Examiner* — Linda B Smith
(74) *Attorney, Agent, or Firm* — Drinker Biddle & Reath LLP (57) ABSTRACT

Provided are a photographing control method and apparatus. The photographing control method includes: obtaining image data from a subject during pre-emission of a strobe, detecting a face region of the subject based on the obtained image data, and performing a calculation for main emission based on the detected face region and controlling main emission of the strobe. Accordingly, even when it is difficult to detect a face because of low brightness at the position of the face, the probability of detecting the face can be increased and an appropriately exposed image can be obtained.

18 Claims, 6 Drawing Sheets

PHOTOGRAPHING CONTROL METHOD AND APPARATUS USING STROBE

CROSS-REFERENCE TO RELATED PATENT APPLICATION

This application claims the benefit of Korean Patent Application No. 10-2008-0082455, filed on Aug. 22, 2008 in the Korean Intellectual Property Office, the entire disclosure of which is incorporated herein by reference.

BACKGROUND OF THE INVENTION

1. Field of the Invention

The present invention relates to a photographing control method and apparatus, and more particularly, to a photographing control method and apparatus using a strobe.

2. Description of the Related Art

Purchasers of photographing apparatuses often perceive the quality of the photographing apparatuses based on the quality of the photographs taken by the photographing apparatus. One of the main functions of modern digital photographing apparatuses is photographing people. Often, people are photographed with the assistance of a strobe light which emits light that is reflected by the person and back to the photographing apparatus. The quality of pictures of people taken by many photographing apparatuses is perceived as being of poor quality because the faces of the people are perceived as either being too dark or too light.

SUMMARY OF THE INVENTION

A photographing control method is disclosed. The photographing control method may include the following steps: (a) controlling the strobe to perform pre-emission and controlling to obtain image data from a subject during the pre-emission; (b) detecting a face region of the subject based on the obtained image data; and (c) performing a calculation for main emission based on the detected face region and controlling main emission of the strobe according to the calculation result.

The photographing control method may further include determining whether a predetermined face region is detected in a live view image, after operation (a), wherein operation (b) is performed according to the determination result.

Operation (b) may be performed if it is determined that the predetermined face region is not detected in the live view image.

The photographing control method may further include determining whether a predetermined face region is detected in a live view image under a strobe light emission condition, before operation (a).

Operation (a) may be performed if it is determined that the predetermined face region is not detected in the live view image.

Operation (a) may be performed if a face region having a brightness higher than that of the strobe light is not detected in the live view image.

The photographing control method may further include determining whether the face region is detected, after operation (b), wherein operation (c) is performed if it is determined that the face region is detected.

If it is determined that the face region is not detected, a general calculation for main emission may be performed and the main emission may be controlled according to the general calculation result.

The photographing control method may further include selecting an auto mode or a fill-in mode as a strobe mode by a user, before operation (a).

A photographing control apparatus using a strobe is disclosed. The photographing control apparatus includes: a control unit controlling the strobe to perform pre-emission and controlling to obtain image data from a subject during the pre-emission; a face detecting unit detecting a face region of the subject based on the obtained image data; a light emission calculating unit performing a calculation for main emission based on the detected face region; and a control unit controlling main emission of the strobe according to the calculation result.

The control unit may determines whether a predetermined face region is detected in a live view image, wherein, if it is determined that the predetermined face region is not detected in the live view image, the control unit controls the strobe to perform pre-emission and controls to obtain the image data.

Under a strobe light emission condition, the control unit may determine whether a predetermined face region is detected in a live view image, wherein, if it is determined that the predetermined face region is not detected in the live view image, the control unit controls the strobe to perform pre-emission and controls to obtain the image data.

If it is determined that a face region having brightness higher than that of the strobe light is not detected in the live view image, the control unit may control the strobe to perform pre-emission and control to obtain the image data.

The control unit may determine whether the face region is detected from the image data that is obtained during the pre-emission, wherein, if it is determined that the face region is detected by the face detecting unit, the control unit controls the light emission calculating unit to perform a calculation for main emission based on the detected face region.

If it is determined that the face region is not detected by the face detecting unit, the control unit may control the light emission calculating unit to perform a general calculation for main emission.

The light emission control unit may control the main emission according to the general calculation result.

A computer program product is disclosed. The computer program product may include a computer-readable medium including a first set of codes for causing a computer to control the strobe to perform pre-emission and controlling to obtain image data from a subject during the pre-emission; a second set of codes for causing a computer to detecting a face region of the subject based on the obtained image data; a third set of codes for causing a computer to perform a calculation for main emission based on the detected face region and control main emission of the strobe according to the calculation result.

A digital photographing apparatus is disclosed. The digital photographing apparatus includes the photographing control apparatus.

The digital photographing apparatus may further include a strobe mode selecting unit selecting an auto mode or a fill-in mode as a strobe mode by a user.

The digital photographing apparatus may further include a strobe light emission performing unit performing pre-emission or main emission under the control of the light emission control unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Therefore there is a need in the art for a photographing control method for improved strobe light strength determination. The photographing control method including (a) controlling the strobe to perform pre-emission and controlling to obtain image data from a subject during the pre-emission; (b) detecting a face region of the subject based on the obtained image data; and (c) performing a calculation for main emission based on the detected face region and controlling main emission of the strobe according to the calculation result.

The disclosure of the photographing apparatus will now be described more fully with reference to the accompanying drawings, in which exemplary embodiments of the disclosure are shown. However, only techniques or structures necessary for understating the principles of the disclosure will be explained and other techniques or structures, which may unnecessarily make the disclosure unclear, will be omitted.

Terms used in the specification and claims should be interpreted as having a meaning that is consistent with the technical concept of the present invention and should not be construed as being limited to those defined in commonly used dictionaries.

Figure 1:
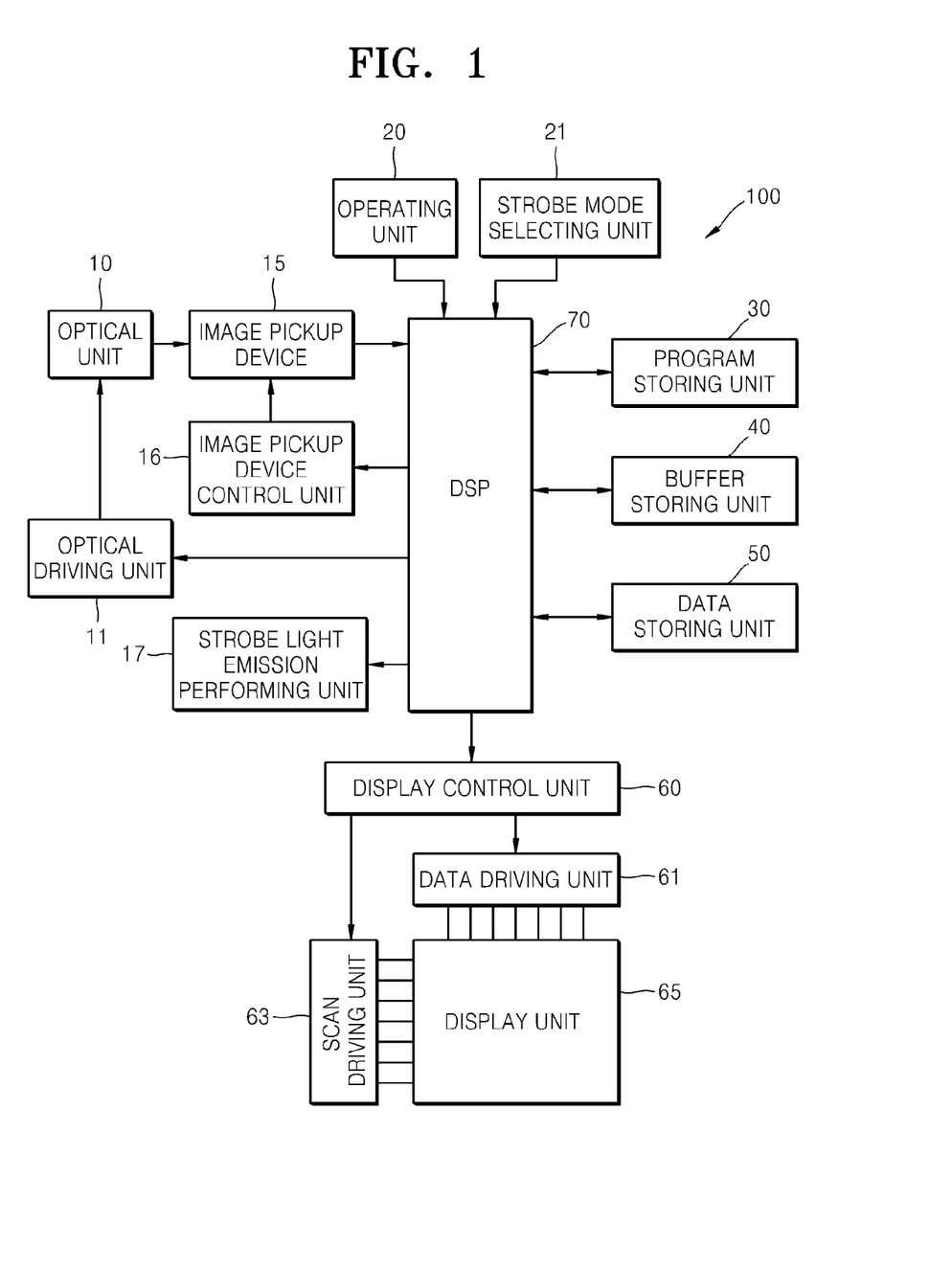
FIG. 1 is a block diagram of an example of a digital photographing apparatus according to the disclosure of the photographing control method and apparatus using a strobo.
Figure 2:
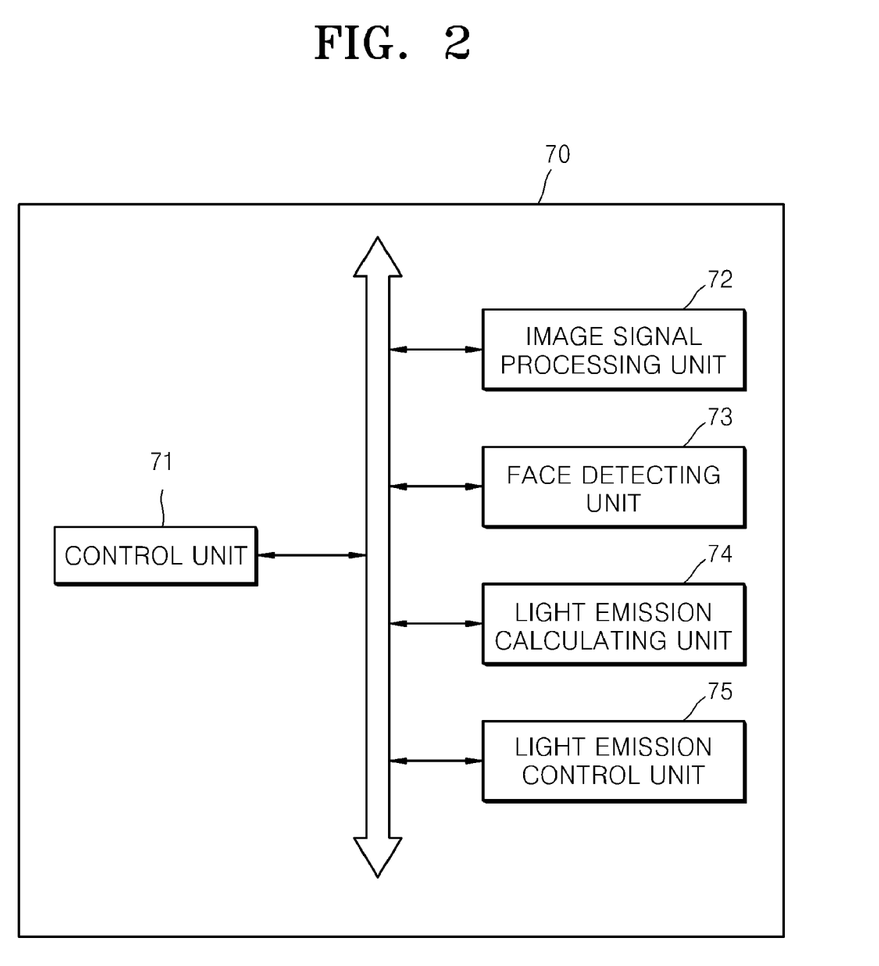
FIG. 2 is a block diagram an example of a digital signal processing (DSP) unit of the digital photographing apparatus of FIG. 1.

FIG. 1 is a block diagram of a digital photographing apparatus 100, e.g., a digital camera, according to an embodiment of the present invention. FIG. 2 is a block diagram of a digital signal processing (DSP) unit 70 of the digital photographing apparatus 100.

Referring to FIG. 1, the digital photographing apparatus 100 includes an optical unit 10, an optical driving unit 11, an image pickup device 15, an image pickup device control unit 16, a strobe light emission performing unit 17, an operating unit 20, a strobe mode selecting unit 21, a program storing unit 30, a buffer storing unit 40, a data storing unit 50, a display control unit 60, a data driving unit 61, a scan driving unit 63, a display unit 65, and the DSP unit 70.

The optical unit 10 receives an optical signal from a subject and provides the received optical signal to the image pickup device 15. The optical unit 10 may include at least one lens of a zoom lens, which varies a focal length to widen or narrow a viewing angle, and a focus lens to focus the subject. The optical unit 10 may further include an iris that is adjustable to vary the amount of light.

The optical driving unit 11 adjusts the position of each lens and the aperture size of the iris. The optical driving unit 11 may adjust the focus of the focus lens by moving the position of the lens, and may adjust the amount of light by adjusting the aperture size of the iris. The optical driving unit 11 may control the optical unit 10 according to a control signal automatically generated by an image signal that is input in real time or a control signal manually input by a user.

The optical signal provided by the optical unit 10 is delivered to a light receiving surface of the image pickup device 15 to form an image of the subject on the light receiving surface of the image pickup device 15. The image pickup device 15 may be a charge coupled device (CCD) or a complementary metal oxide semiconductor image sensor (CIS) which converts the optical signal into an electrical signal. The image pickup device control unit 16 may adjust the sensitivity of the image pickup device 15. The image pickup device control unit 16 may control the image pickup device 15 according to a control signal automatically generated by an image signal that is input in real time or a control signal manually input by the user.

The strobe light emission performing unit 17 performs pre-emission or main emission under the control of a light emission control unit 75 of the DSP unit 70 of FIG. 2. Here, strobe refers to a strong light source that is installed in, or communicatively coupled to, a digital photographing apparatus and emits light at the same time as a shutter is pressed in order to compensate for the lack of light during photographing. Pre-emission refers to light emission of the strobe before the main emission, which is used to measure the brightness of the subject. In FIG. 1, after the pre-emission, image data is obtained from the subject.

The operating unit 20 is a unit with which the user or an external operator inputs a control signal. The operating unit 20 includes various buttons, such as a shutter-release button which can be pressed to input a shutter-release signal for exposing the image pickup device 15 to light for a predetermined period of time and taking photographs, a power button which can be pressed to supply power, a wide angle-zoom button and a telephoto-zoom button which can be pressed to respectively widen and narrow the angle of view according to operation, a mode button which can be pressed to select one of a letter input mode, a photographing mode, a reproduction mode, and so on, a white balance setting button, and an exposure setting button. Although the operating unit 20 of FIG. 1 includes such various buttons, the present invention is not limited thereto and the operating unit 20 may be embodied as any type of unit such as a keypad, a touchpad, a touch screen, or a remote controller through which the user can input the control signal.

The strobe mode selecting unit 21 allows the user to select an auto mode or a fill-in mode. Here, auto mode refers to a mode in which a digital photographing apparatus determines whether to cause a strobe to emit light by measuring the state of surrounding light. For example, in auto mode, the light surrounding the subject is measured, it is determined whether the brightness of the subject is higher or lower than the strobe light brightness, and the strobe emits light if it is determined that the brightness of the subject is lower than the strobe light brightness. Fill-in mode refers to a mode in which the strobe emits light irrespective of the state of surrounding light. For example, in fill-in mode, even under the strong sun or backlight, both the subject and a background can be displayed well. Although the strobe mode selecting unit 21 in FIG. 1 allows the user to select the auto mode or the fill-in mode, the disclosure is not limited thereto, and a no flash mode or a red-eye reduction mode may be selected. Also, although the operating unit 20 and the strobe mode selecting unit 21 are separated from each other in FIG. 1, the disclosure is not limited thereto, and the function of the strobe mode selecting unit 21 may be integrated into the operating unit 20.

The digital photographing apparatus 100 includes the program storing unit 30 storing a program such as an application system or an operating system for driving the digital photographing apparatus 100, the buffer storing unit 40 temporarily storing data necessary for calculations or calculated data, and the data storing unit 50 storing various information necessary for the program, such as an image file including an image signal.

The digital photographing apparatus 100 also includes the display control unit 60 controlling the operation state of the digital photographing apparatus 100 or image information about an image captured by the digital photographing apparatus 100 to be displayed, the data driving unit 61 and the scan driving unit 63 delivering display data input from the display control unit 60, and the display unit 65 displaying a predetermined image according to a signal input from each of the data driving unit 61 and the scan driving unit 63. The display unit 65 may be a liquid crystal display (LCD) panel, an organic light emitting display (OLED) panel, and an electrophoresis display (EDD) panel.

The digital photographing apparatus 100 also includes the DSP unit 70 that processes an input image signal, and controls each of the elements of the digital photographing apparatus 100 according to the processed image signal or an external input signal.

FIG. 2 is a block diagram of an example of a digital signal processing (DSP) unit 70 of the digital photographing apparatus 100 of FIG. 1. The DSP unit 70 includes a control unit 71, an image signal processing unit 72, a face detecting unit 73, a light emission calculating unit 74, and the light emission control unit 75.

The control unit 71 controls the overall operation of the DSP unit 70.

The control unit 71 controls the light emission control unit 75 so that the strobe light emission performing unit 17 performs pre-emission and controls the image signal processing unit 72 to obtain image data from a predetermined subject during the pre-emission.

The image signal processing unit 72 obtains the image data from the subject during the pre-emission under the control of the control unit 71. The image signal processing unit 72 provides the obtained image data to the face detecting unit 73 so that the face detecting unit 73 detects a face region of the subject.

The image signal processing unit 72 converts an image signal input from the image pickup device 15 into a digital signal, and performs image processing, such as gamma correction, color filter array interpolation, color matrix, color correction, or color enhancement, so as to change the image signal to a desired one for human vision. The image signal processing unit 72 may also implement an auto white balance or auto exposure algorithm once the function of the image signal processing unit 72 is determined. The image signal processing unit 72 adjusts the size of image data by using a scaler and yields a predetermined compressed image file. Also, the image processing unit 72 may decompress the compressed image file. The image signal processing unit 72 may perform such image signal processing on an image signal input by a shutter-release button and an image signal input in real time in a live view mode before photographing. At this time, the image signal processing unit 72 may perform different image signal processing on each of the image signals.

The face detecting unit 73 detects the face region of the subject based on the image data input from the image signal processing unit 72. In FIG. 2, the face detecting unit 73 detects the face region from the image data obtained during the pre-emission. The face detecting unit 73 may perform a calculation for face detection from image data obtained in a live view mode.

The face detecting unit 73 detects a region having facial features, for example, a region having flesh tones, a region having pupils, or a region having a face shape, as a face region.

Methods that may be used by the face detecting unit 73 to detect a face include, but are not limited to, a motion vector search algorithm, a feature point detection algorithm, and an Adaboost learning algorithm.

The light emission calculating unit 74 performs a calculation for main emission based on the face region detected by the face detecting unit 73. The calculation for main emission based on the face region is performed by calculating the amount of light emitted by the strobe based on the detected face. For example, the light emission calculating unit 74 calculates an appropriate amount of light emission according to the brightness level of the detected face region. If the face detecting unit 73 fails to detect the face region from the subject during the pre-emission, a general calculation for main emission, which is performed by calculating a total amount of light emission, may be performed according to results measured during the pre-emission. Although the light emission calculating unit 74 in FIG. 2 calculates the amount of light emitted by the strobe, the present invention is not limited thereto, and a color temperature may be detected and the color temperature of strobe light may be corrected based on the detected color temperature.

The light emission control unit 75 controls main emission of the strobe light emission performing unit 17 according to the calculation for main emission performed by the light emission calculating unit 74. The light emission control unit 75 controls the pre-emission of the strobe light emission performing unit 17 under the control of the control unit 71.

Under a strobe light emission condition, the control unit 71 determines whether a predetermined face region is detected in a live view image, and controls the strobe to perform pre-emission if it is determined that the face region is not detected in the live view image and controls to obtain image data. If a strobe mode is a strobe auto mode, the strobe light emission condition may be a surrounding brightness level under which whether the strobe emits light is determined by surrounding light.

If it is determined that a face region having brightness higher than that of the strobe light is not detected, the control unit 71 may control the strobe to perform pre-emission and controls to obtain image data. If a face region having a brightness lower than that of the strobe light is detected and a calculation for main emission is performed based on the detected face region, the face region cannot be displayed well. Accordingly, even in the latter case, image data is obtained during pre-emission and a face region is detected again based on the obtained image data.

The control unit 71 determines whether the face region is detected from the image data that is obtained during the pre-emission, and if it is determined that the face region is detected by the face detecting unit 73, controls the light emission calculating unit 74 to perform a calculation for main emission based on the detected face region, and if it is determined otherwise that the face region is not detected by the face detecting unit 73, controls the light emission calculating unit 74 to perform a general calculation for main emission.

Figure 3:
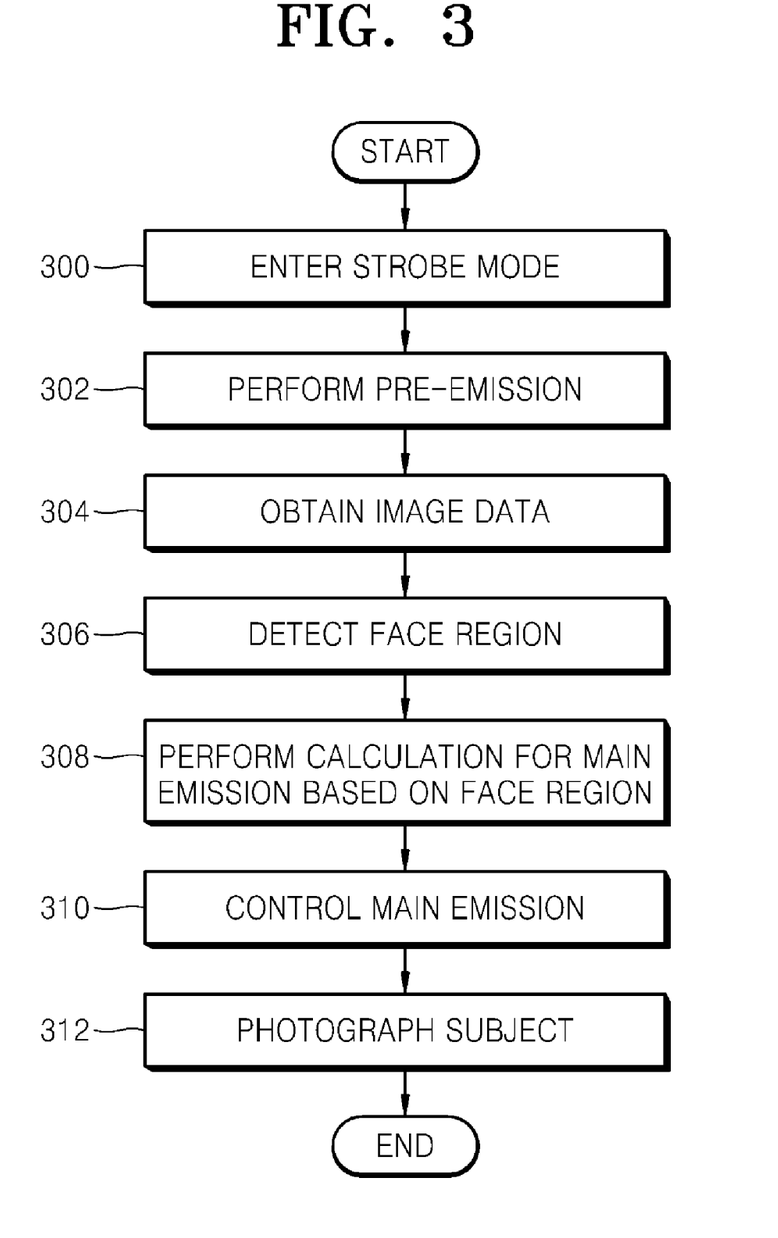
FIG. 3 is a flowchart illustrating an example of a photographing control method using a strobe, according to an embodiment of the present invention.

FIG. 3 is a flowchart illustrating a photographing control method using a strobe, according to an embodiment of the present invention.

Referring to FIG. 3, in operation 300, a strobe mode is entered. The strobe mode includes an auto mode and a fill-in mode, but does not include a no flash mode because any light emission of the strobe is prohibited in the no flash mode.

In operation 302, the strobe performs pre-emission. In operation 304, image data is obtained from a subject. In operation 306, a face region of the subject is detected by using the obtained image data. In operation 308, a calculation for main emission is performed based on the detected face region. That is, the brightness level of the face region is calculated, and an appropriate amount of light emission corresponding to the calculated brightness level of the face region is calculated.

In operation 310, main emission is controlled to ensure the calculated appropriate amount of light emission. In operation 312, the subject is photographed.

Figure 4A:
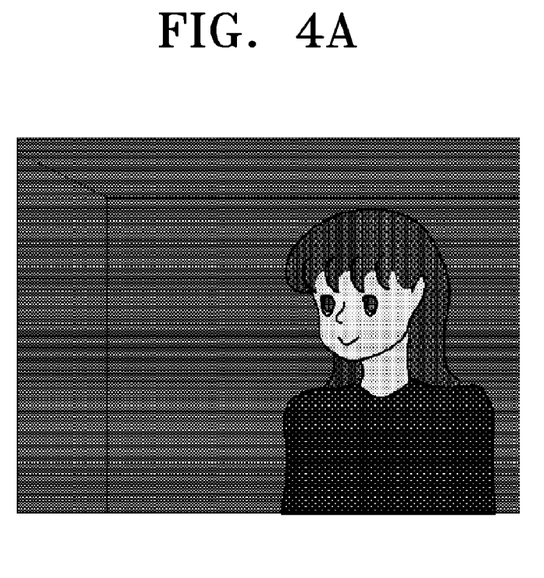
FIGS. 4A and 4B are example views for explaining strobe light emission and face detection.
Figure 4B:
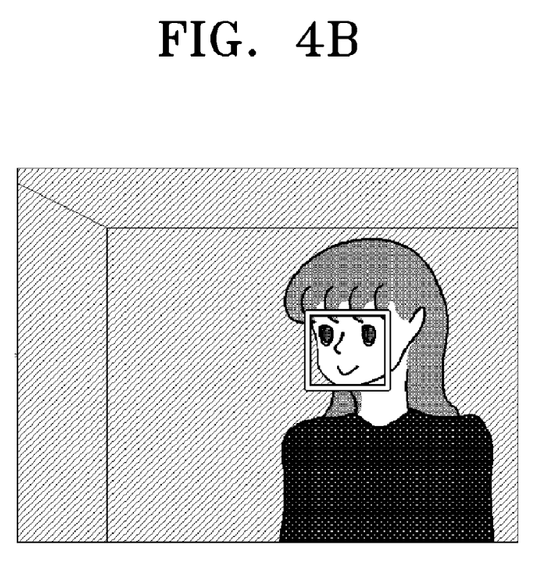

FIGS. 4A and 4B are views for explaining strobe light emission and face detection. FIG. 4A illustrates an example of an image taken using a strobe light where the strength of the strobe light is too strong and makes the person's face appear too bright. The method to obtain the image of FIG. 4A included: a pre-emission of the strobe light to obtain an image for calculating the strength of the strobe light to use for the main emission. Calculating the strength of the strobe light to use for the main emission based on the brightness of the black dress, the dark background and the face of the person in the image obtained from the pre-emission. FIG. 4B illustrates an example of an image with the strobe light controlled by the method of FIG. 3 where the face does not appear too bright. By using the method of FIG. 3, image data is obtained during pre-emission; a face region is detected in the obtained image data; and a calculation for main emission of the strobe light is based on the detected face region.

Detecting a face in an image with a dark background as illustrated in FIG. 4A may be difficult. However, the method of FIG. 3 can increase the probability of detecting the face by using the image data that is obtained during the pre-emission, since the pre-emission of the strobe light will produce a brighter image.

Figure 5A:
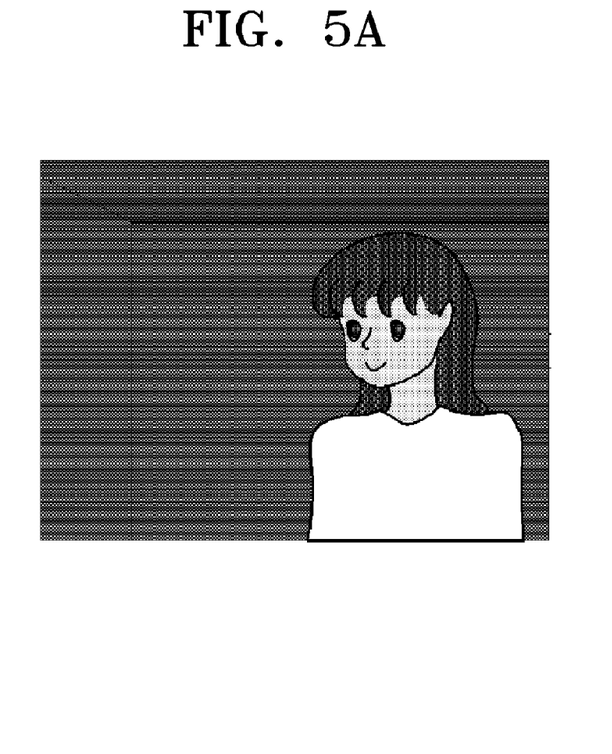
FIGS. 5A and 5B are example views for explaining strobe light emission and face detection.
Figure 5B:
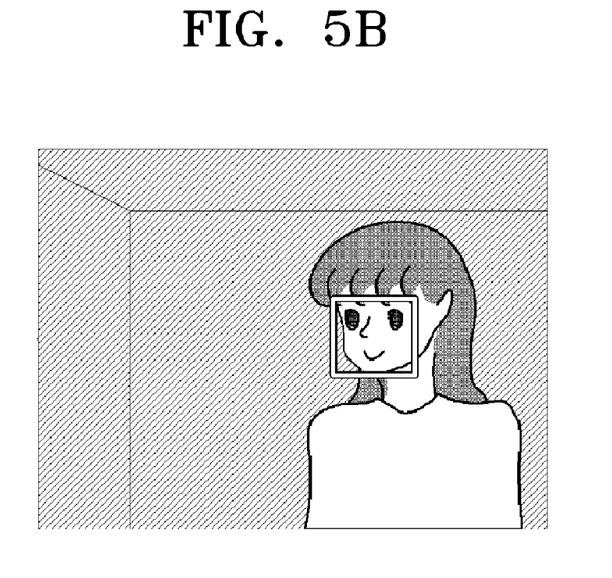

FIGS. 5A and 5B are examples of views for explaining strobe light emission and face detection. In FIG. 5A, a person is dressed in white. In FIG. 5A, the strength of the strobe light is calculated based on the brightness of an obtained image, where the image may be obtained after a pre-emission. The pre-emission increases the average brightness of the person. The face region of the person appears too dark because the strobe light strength was reduced too much due to the brightness of the white dress in the image obtained after a pre-emission. However, the method of FIG. 3 can appropriately illuminate the face region of the person as shown in FIG. 5B by detecting the face region in the image data obtained during pre-emission, and performing a calculation for main emission strength of the strobe light based on the detected face region.

Figure 6:
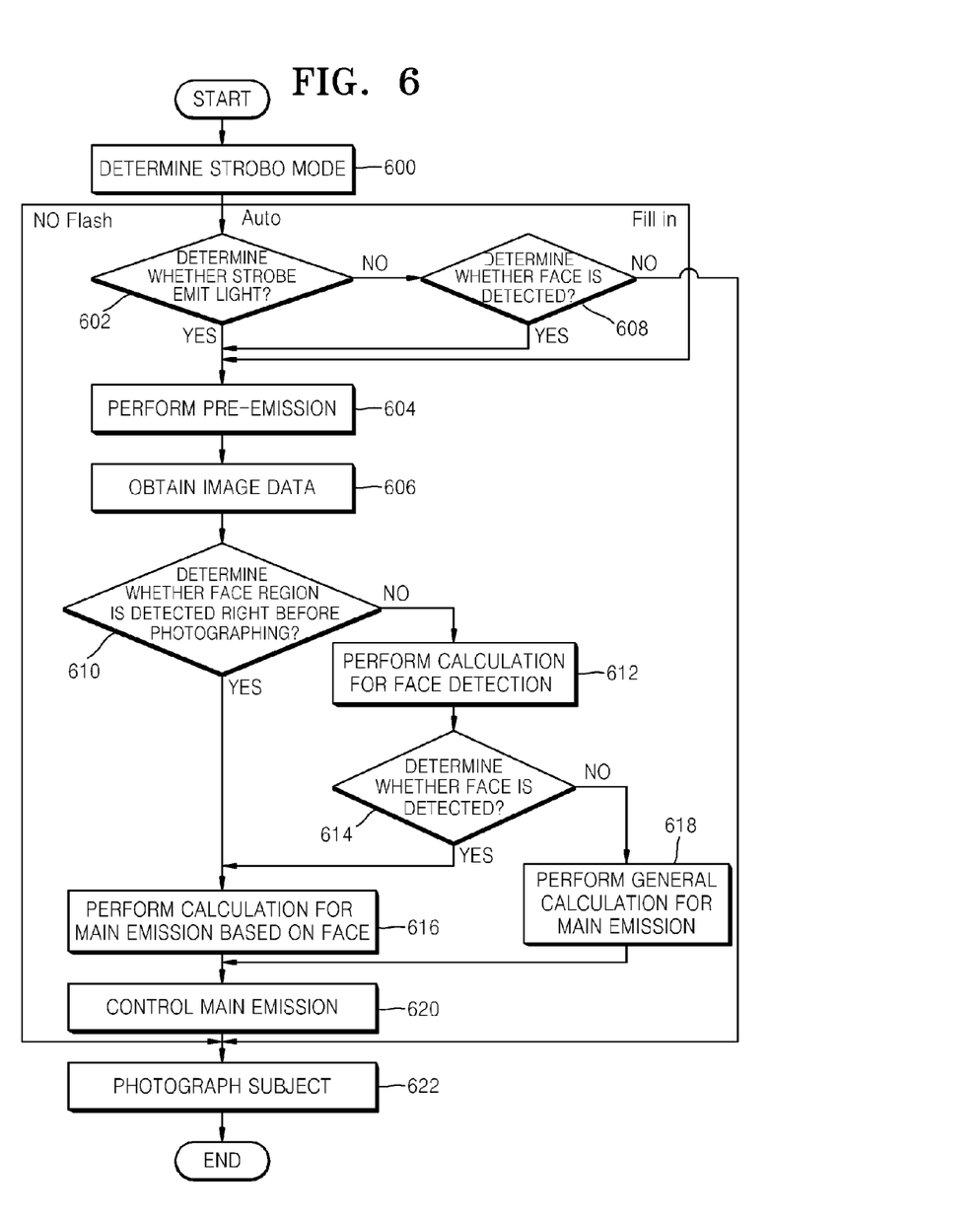
FIG. 6 is a flowchart illustrating an example of a photographing control method using a strobe.

FIG. 6 is a flowchart illustrating a photographing control method using a strobe, according to another embodiment of the present invention.

Referring to FIG. 6, in operation 600, the strobe mode is determined. The strobe mode includes a no flash mode, an auto mode, and a fill mode. Since the no flash mode is a mode in which any light emission of a strobe light is prohibited, the method proceeds to operation 622 in which photographing is performed.

In the auto mode, in operation 602, it is determined whether the strobe emits light by determining whether the surrounding brightness is lower than the strobe light brightness. If it is determined that the surrounding brightness is lower than the strobe light brightness, the method proceeds to operation 604. In operation 604, the strobe performs pre-emission. Otherwise, if it is determined that the surrounding brightness is higher than the strobe light brightness, the method proceeds to operation 608. In operation 608, it is determined whether a face of a subject is detected in a live view image. If it is determined in operation 608 that the face of the subject is not detected in the live view image, the method proceeds to operation 622 in which photographing is performed. Otherwise, if it is determined in operation 608 that the face of the subject is detected in the live view image, the method proceeds to operation 604.

In the fill-in mode, since the strobe is forced to emit light irrespective of the surrounding brightness, the method proceeds to operation 604.

In operation 604, the strobe performs pre-emission. In operation 606, image data is obtained from the subject. Since an image of the image data is obtained during the pre-emission, the brightness level of the image is higher than that of an original image that is not subjected to any light emission. In operation 610, it is determined whether a face region is detected right before photographing. If it is determined in operation 610 that the face region is detected right before photographing, the method proceeds to operation 616. In operation 616, a calculation for main emission is performed based on the detected face region. In operation 620, the main emission is controlled. In operation 622, the subject is photographed. Accordingly, a time delay caused when a calculation for face detection must be performed can be reduced.

Otherwise, if it is determined in operation 610 that no face is detected right before shooting, the method proceeds to operation 612. In operation 612, a calculation for face detection is performed. In operation 614, it is determined whether the face is detected. If it is determined in operation 614 that the face is not detected, the method proceeds to operation 618. In operation 618, a general calculation for main emission is performed. In operation 620, the main emission is controlled. In operation 622, the subject is photographed. Otherwise, if it is determined in operation 614 that the face is detected after calculation is performed based on the image data obtained during the pre-emission, the method proceeds to operation 616. In operation 616, a calculation for main emission based on the detected face is performed. In operation 620, the main emission is controlled according to the calculation for main emission based on the detected face. In operation 622, the subject is photographed.

Although the digital photographing apparatus is exemplarily the digital photographing apparatus 100 in the above embodiments, the present invention is not limited thereto and it is understood by one of ordinary skill in the art that the digital photographing apparatus may be a camera phone, a personal digital assistant (PDA), or a portable multimedia player (PMP) which has a camera function and a strobe.

As described above, the probability of detecting a face can be increased and an appropriately exposed image can be obtained even when it is difficult to detect the face because of low brightness at the position of the face region.

The present invention may be embodied as computer-readable codes in a computer-readable recording medium. The computer-readable recording medium may be any recording apparatus capable of storing data that is read by a computer system.

Examples of the computer-readable recording medium include, but are not limited to, read-only memories (ROMs), random-access memories (RAMs), compact disk (CD)-ROMs, magnetic tapes, floppy disks, optical data storage devices, and carrier waves (such as data transmission through the Internet that transmits data via the Internet. The computer readable medium may be distributed among computer systems that are interconnected through a network, and the present invention may be stored and implemented as computer readable codes in the distributed system. Functional programs, codes, and code segments for embodying the present invention may be easily derived by programmers in the technical field to which the present invention pertains.

The various illustrative units, logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the present invention has been particularly shown and described with reference to exemplary embodiments thereof using specific terms, the embodiments and terms have been used to explain the present invention and should not be construed as limiting the scope of the present invention defined by the claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A photographing control method using a strobe, the photographing control method comprising:
    (a) controlling the strobe to perform pre-emission and controlling to obtain image data from a subject during the pre-emission, if a face region having brightness higher than that of the strobe light is not detected in a live view image;
    (b) detecting a face region of the subject based on the obtained image data; and
    (c) performing a calculation for main emission based on the detected face region and controlling main emission of the strobe according to the calculation result.

2. The photographing control method of claim 1, further comprising determining whether a predetermined face region is detected in a live view image, after operation (a),
    wherein operation (b) is performed according to the determination result.

3. The photographing control method of claim 1, further comprising determining whether a predetermined face region is detected in a second live view image under a strobe light emission condition, before operation (a).

4. The photographing control method of claim 1, further comprising determining whether the face region is detected, after operation (b),
    wherein operation (c) is performed if it is determined that the face region is detected.

5. The photographing control method of claim 1, further comprising selecting an auto mode or a fill-in mode as a strobe mode by a user, before operation (a).

6. The photographing control method of claim 2, wherein operation (b) is performed if it is determined that the predetermined face region is not detected in the live view image.

7. The photographing control method of claim 3, wherein operation (a) is performed if it is determined that the predetermined face region is not detected in the second live view image.

8. The photographing control method of claim 4, wherein, if it is determined that the face region is not detected, a general calculation for main emission is performed and the main emission is controlled according to the general calculation result.

9. A computer-readable non-transitory medium comprising:
    a first set of codes for causing a computer to control the strobe to perform pre-emission and controlling to obtain image data from a subject during the pre-emission if a face region having brightness higher than that of the strobe light is not detected in a live view image; a second set of codes for causing a computer to detecting a face region of the subject based on the obtained image data; a third set of codes for causing a computer to perform a calculation for main emission based on the detected face region and control main emission of the strobe according to the calculation result.

10. A photographing control apparatus using a strobe, the photographing control apparatus comprising:
    a control unit configured to control the strobe to perform pre-emission and to obtain image data from a subject during the pre-emission, if it is determined that a face region having brightness higher than that of the strobe light is not detected in the live view image;
    a face detecting unit configured to detect a face region of the subject based on the obtained image data;
    a light emission calculating unit configured to perform a calculation for main emission based on the detected face region; and
    a control unit configured to control main emission of the strobe according to the calculation result.

11. The photographing control apparatus of claim 10, wherein the control unit is configured to determine whether a predetermined face region is detected in the live view image,
    wherein, if it is determined that the predetermined face region is not detected in the live view image, the control unit controls the strobe to perform pre-emission and controls to obtain the image data.

12. The photographing control apparatus of claim 10, wherein, under a strobe light emission condition, the control unit is configured to determine whether a predetermined face region is detected in the live view image,
    wherein, if it is determined that the predetermined face region is not detected in the live view image, the control unit is configured to control the strobe to perform pre-emission and to obtain the image data.

13. The photographing control apparatus of claim 10, wherein the control unit is configured to determine whether the face region is detected from the image data that is obtained during the pre-emission, wherein, the control unit is configured to control the light emission calculating unit to perform a calculation for main emission based on the detected face region, if it is determined that the face region is detected by the face detecting unit.

14. A digital photographing apparatus comprising the photographing control apparatus of claim 10.

15. The photographing control apparatus of claim 13, wherein, the control unit is configured to control the light emission calculating unit to perform a general calculation for main emission, if it is determined that the face region is not detected by the face detecting unit.

16. The digital photographing apparatus of claim 14, further comprising a strobe mode selecting unit selecting an auto mode or a fill-in mode as a strobe mode by a user.

17. The digital photographing apparatus of claim 14, further comprising a strobe light emission performing unit performing pre-emission or main emission under the control of the light emission control unit.

18. The photographing control apparatus of claim 15, wherein the light emission control unit is configured to control the main emission according to the general calculation result.

* * * * *